(12) United States Patent
Dabosville et al.

(10) Patent No.: US 10,528,943 B2
(45) Date of Patent: Jan. 7, 2020

(54) METHOD AND SECURE DEVICE FOR PERFORMING A TRANSACTION

(71) Applicant: IDEMIA France, Colombes (FR)

(72) Inventors: Guillaume Dabosville, Nanterre (FR); Emmanuelle Dottax, Nanterre (FR); Yannick Sierra, Nanterre (FR); Elder Dos Santos, Nanterre (FR); Olivier Condemine, Nanterre (FR); Omar Laazimani, Nanterre (FR)

(73) Assignee: IDEMIA FRANCE, Colombes (FR)

( * ) Notice: Subject to any disclaimer, the term of this patent is extended or adjusted under 35 U.S.C. 154(b) by 762 days.

(21) Appl. No.: 13/773,298

(22) Filed: Feb. 21, 2013

(65) Prior Publication Data

US 2013/0218775 A1  Aug. 22, 2013

(51) Int. Cl.
| | | |
|---|---|---|
| G06Q 20/40 | (2012.01) | |
| G06F 1/16 | (2006.01) | |
| G06Q 20/10 | (2012.01) | |
| G06Q 20/32 | (2012.01) | |
| G06Q 20/42 | (2012.01) | |
| G06F 21/31 | (2013.01) | |
| G06F 3/0346 | (2013.01) | |
| G06F 3/0484 | (2013.01) | |

(52) U.S. Cl.
CPC ........... *G06Q 20/40* (2013.01); *G06F 1/1694* (2013.01); *G06F 3/0346* (2013.01); *G06F 3/04847* (2013.01); *G06F 21/316* (2013.01); *G06Q 20/10* (2013.01); *G06Q 20/32* (2013.01); *G06Q 20/3229* (2013.01); *G06Q 20/3274* (2013.01); *G06Q 20/3278* (2013.01); *G06Q 20/401* (2013.01); *G06Q 20/4012* (2013.01); *G06Q 20/4016* (2013.01); *G06Q 20/42* (2013.01); *G06F 2221/2133* (2013.01)

(58) Field of Classification Search
None
See application file for complete search history.

(56) References Cited

U.S. PATENT DOCUMENTS

| 8,255,323 | B1 | 8/2012 | Casey et al. | |
|---|---|---|---|---|
| 8,433,914 | B1 * | 4/2013 | Philpott | H04L 9/3215 |
| | | | | 713/176 |
| 2002/0045975 | A1 * | 4/2002 | Carr | B61L 25/025 |
| | | | | 701/19 |
| 2008/0182592 | A1 * | 7/2008 | Cha et al. | 455/456.3 |
| 2009/0152343 | A1 * | 6/2009 | Carter et al. | 235/379 |
| 2012/0075439 | A1 * | 3/2012 | Gong | H04N 5/247 |
| | | | | 348/61 |

(Continued)

FOREIGN PATENT DOCUMENTS

| KR | 10-2006-0135340 A | 12/2006 |
|---|---|---|
| KR | 10-2007-0045765 A | 5/2007 |
| WO | WO 2011/066381 A2 | 6/2011 |

OTHER PUBLICATIONS

Search Report issued in French Application No. 1251593, dated Oct. 22, 2012, 2 pages.

*Primary Examiner* — Chinedu C Agwumezie
(74) *Attorney, Agent, or Firm* — Arent Fox, LLP (57) ABSTRACT

A method for determining the presence of a human being, comprising:
  measuring (S6) a movement (MOV) of a first device (4) by a sensor (44) of said first device (4),
  determining the presence of a human being on the basis of the measured movement (MOV).

11 Claims, 8 Drawing Sheets

(56) References Cited

U.S. PATENT DOCUMENTS

| | | | |
|---|---|---|---|
| 2012/0159156 A1* | 6/2012 | Barham | G06F 21/6218 |
| | | | 713/156 |
| 2012/0173423 A1* | 7/2012 | Burdett | G06Q 20/3223 |
| | | | 705/44 |
| 2012/0217313 A1* | 8/2012 | Bowman et al. | 235/492 |
| 2013/0046635 A1* | 2/2013 | Grigg et al. | 705/14.58 |
| 2013/0142384 A1* | 6/2013 | Ofek | G06K 9/00771 |
| | | | 382/103 |
| 2013/0145160 A1* | 6/2013 | Bursell | G06F 21/6218 |
| | | | 713/168 |
| 2013/0191246 A1* | 7/2013 | Calman | G06Q 30/0639 |
| | | | 705/26.9 |

* cited by examiner

METHOD AND SECURE DEVICE FOR PERFORMING A TRANSACTION

CROSS-REFERENCE TO RELATED APPLICATION

This application is based upon and claims the benefit of priority of the prior French Patent Application No. 1251593, filed Feb. 22, 2012, the disclosure of the prior application is hereby incorporated in its entirety by reference.

FIELD OF THE INVENTION

The invention relates to the field of transactions involving a communication between the terminal of a user and a server.

BACKGROUND OF THE INVENTION

When a transaction is performed between the terminal of a user and a server, it is generally desirable for the server to authenticate the user. Common techniques for authenticating a user are the use of a login and a password, a cryptographic signature calculated by a secure element such as a SIM card, etc.

Furthermore, considering the possibility that a malicious computer program commonly known as a malware may run on the user's terminal, it is also desirable for the server to verify that the transaction is performed under control of the user.

A common technique for verifying that a transaction is performed under the control of a user (a human being) is a challenge-response test known as CAPTCHA. Typically, the server sends an image to the terminal which comprises alphanumeric characters that are difficult to recognize for an OCR program, but visible to a human. The terminal displays the image and the user enters the alphanumeric characters. The server checks that the entered characters correspond to the image.

However, an attack is still possible and indeed, some character recognition software have been developed to recognise the information in a CAPTCHA image.

Thus, it is desirable to improve the techniques for verifying that a transaction is performed under the control of a user.

SUMMARY AND OBJECT OF THE INVENTION

The invention provides a method for determining the presence of a human being, comprising:
  measuring a movement of a first device by a sensor of said first device,
  determining the presence of a human being on the basis of the measured movement.

In an embodiment, the method comprises outputting a stimuli on a user interface, wherein the stimuli comprises instructions for performing a predetermined movement, wherein determining the presence of a human being on the basis of the measured movement comprises determining the presence of a human being on the basis of the measured movement and of the predetermined movement.

The method may comprise:
  transmitting the stimuli from a server to said user interface,
  determining, by said first device, a signature on the basis of the measured movement,
  transmitting said signature from the first device to the server.

The method may comprise:
  transmitting first data from a server to said first device,
  determining, by said first device, said stimuli on the basis of said first data,
  determining, by said first device, whether the measured movement and the predetermined movement match,
  if the measured movement and the predetermined movement match, determining, by said first device, a signature on the basis of the first data,
  transmitting said signature from the first device to the server.

Said first data may comprise an amount of a payment transaction.

Said first device may be a secure element.

Outputting the stimuli on the user interface may comprise outputting the stimuli on the user interface of a second device different from said first device.

In an embodiment, the method comprises:
  determining transaction data on the basis of the measured movement,
  determining, by said first device, a signature on the basis of said transaction data,
  transmitting said signature from the first device to a server.

Said transaction data may comprise an amount of a payment transaction.

In an embodiment, the first device is configured for authorising the execution of a function protected by authentication upon reception of identification or authentication data entered by a user, the method comprising determining said identification or authentication data on the basis of the measured movement.

The first device may have a first state wherein it accepts identification or authentication data entered on a user interface of a second device and a second state wherein it does not accept identification or authentication data entered on said user interface, the method comprising a step of commuting from said first state to said second state in response to a detection that the second device performs a predetermined transaction.

The invention also provides a system for determining the presence of a human being, comprising:
  a first device comprising a sensor for measuring a movement of said first device,
  means for determining the presence of a human being on the basis of the measured movement.

The system may comprise a second device having a user interface for outputting a stimuli, wherein the stimuli comprises instructions for performing a predetermined movement, wherein the means for determining the presence of a human being are configured for determining the presence of a human being on the basis of the measured movement and of the predetermined movement.

The first device may be a secure element inserted in said second device.

BRIEF DESCRIPTION OF THE DRAWINGS

These and other objects and features of the present invention will become clear from the following description of the preferred embodiments given with reference to the accompanying drawings, in which.

DETAILED DESCRIPTION OF PREFERRED EMBODIMENTS

Figure 1:
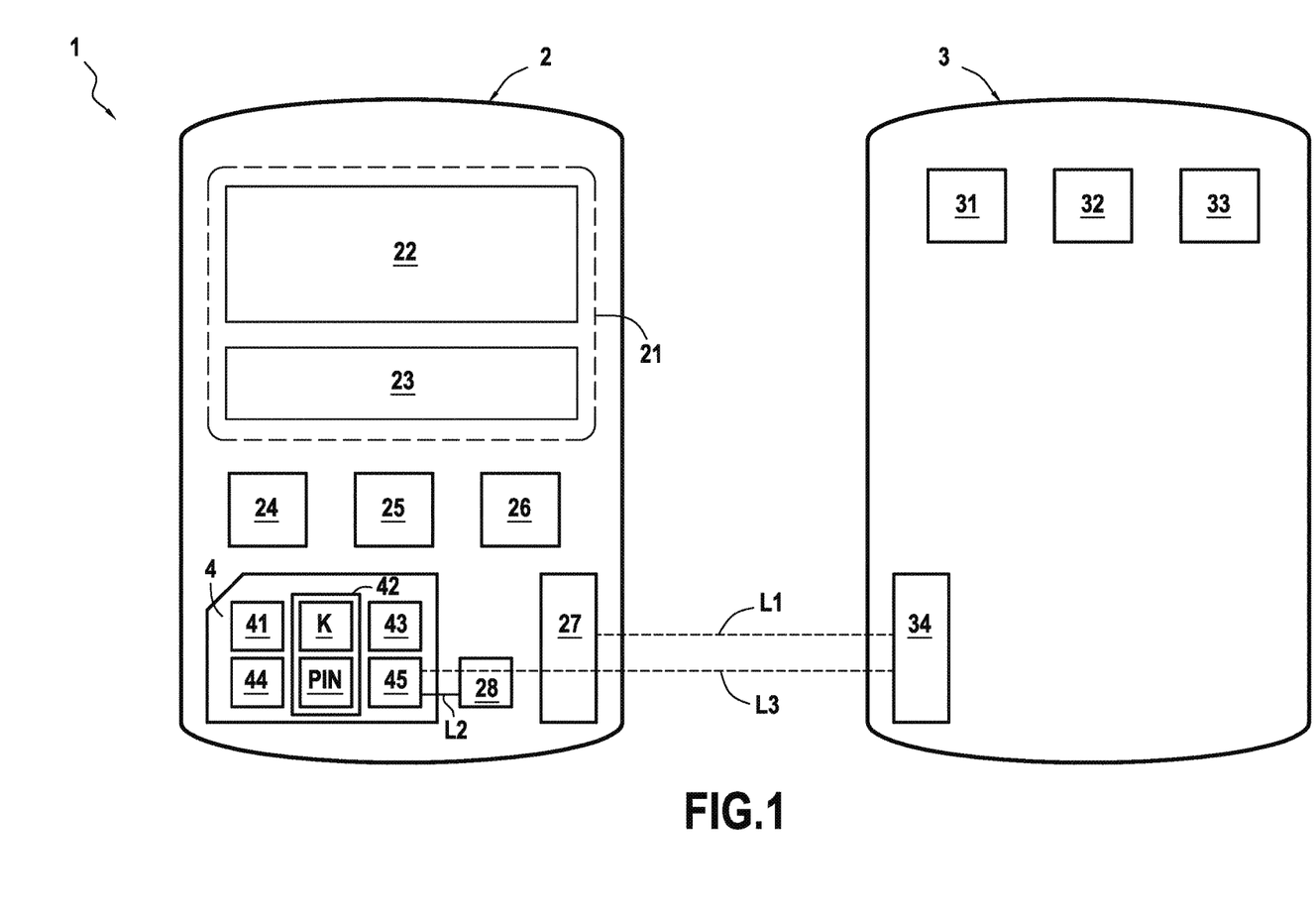
FIG. 1 shows a system according to an embodiment of the invention.

FIG. 1 shows a system 1 which comprises a terminal 2, a server 3, and a secure element 4. In an example embodiment, the terminal 2 is the mobile phone of a user (a human being), the server 3 is a point-of-sale payment terminal and the secure element 2 is a smart card inserted in the terminal, for example a SIM card. However, the invention is not limited to this embodiment. For example, the terminal 2 may be a personal computer, a portable electronic device, etc. The server 3 may be an ATM or a web server. The secure element 4 may be a USB key connected to terminal 2 or a separate device which communicates with the terminal 2 by a wireless or wire connection. Also, the terminal 2 and the server 3 may be the same device.

The terminal 2 presents the general architecture of a computer. It comprises a user interface 21 which include for example a screen 22 and a keyboard 23 or a touchscreen, a processor 24, a non-volatile memory 25, a volatile memory 26, a communication interface 27 and a communication interface 28. The processor 24 allows executing computer programs stored in non-volatile memory 25, by using volatile memory 26. The functioning of the terminal 2 described hereafter corresponds to the execution of such computer programs.

The communication interface 27 allows communication between the terminal 2 and the server 3 through a link L1. For example, communication interface 27 is a short range radio communication interface, for example a Near Field Communication (NFC) interface which includes a Frontend NFC and a NFC antenna. In other embodiments, the communication interface 27 is configured for communication with the server 3 through a wire or wireless network, for example through the Internet and/or through a mobile phone network.

The communication interface 28 allows communication between the terminal 2 and the secure element 4 through a link L2. In the example of a smart card inserted in the terminal 3, the link L2 is for example a standardised ISO 7816 link.

The secure element 4 presents the general architecture of a computer. It comprises a processor 41, a non-volatile memory 12, a volatile memory 43, a sensor 44 and a communication interface 45. The processor 41 allows executing computer programs stored in non-volatile memory 42, by using volatile memory 43. The functioning of the secure element 4 described hereafter corresponds to the execution of such computer programs. The communication interface 45 allows communication between the terminal 2 and the secure element 4 through link L2. The non-volatile memory 42 stores a PIN code and a cryptographic key K of the user. The sensor 44 is for example a MEMS sensor, an accelerometer, a compass, etc. configured for measuring a movement, an orientation or a position of the secure element 2.

Links L1 and L2 allow communication between the secure element 4 and the server 2 through a link L3, which is based for example on SWP protocols and which enables communication between an NFC frontend and the secure element 4.

The server 3 presents the general architecture of a computer. It comprises a processor 31, a non-volatile memory 32, a volatile memory 33 and a communication interface 34. The processor 31 allows executing computer programs stored in non-volatile memory 32, by using volatile memory 33. The functioning of the server 3 described hereafter corresponds to the execution of such computer programs. The communication interface 34 allows communication between the terminal 2 and the server 3 through link L1.

In the system of FIG. 1, the secure element 4 is considered a more secure environment than the terminal 2. Indeed, installing new applications by loading computer programs in the non-volatile memory 25 of the terminal 2 is a usual task which can be performed by the user of the terminal 2. Installing of a new application in the terminal 2 may involve, without knowledge of the user, the installation of a malware. Thus, a malware may by running on the terminal 2. In contrast, loading a computer program in the non-volatile memory 42 of the secure element 4 can only be performed after authentication by an authorised party, for example the manufacturer or the issuer of the secure element or a trusted third party. In other words, the secure element 4 comprises means for authorising the loading of a computer program in its non-volatile memory 42 only after authentication by an authorised party. Thus, normally there is no malware running on the secure element 4.

Figure 2:
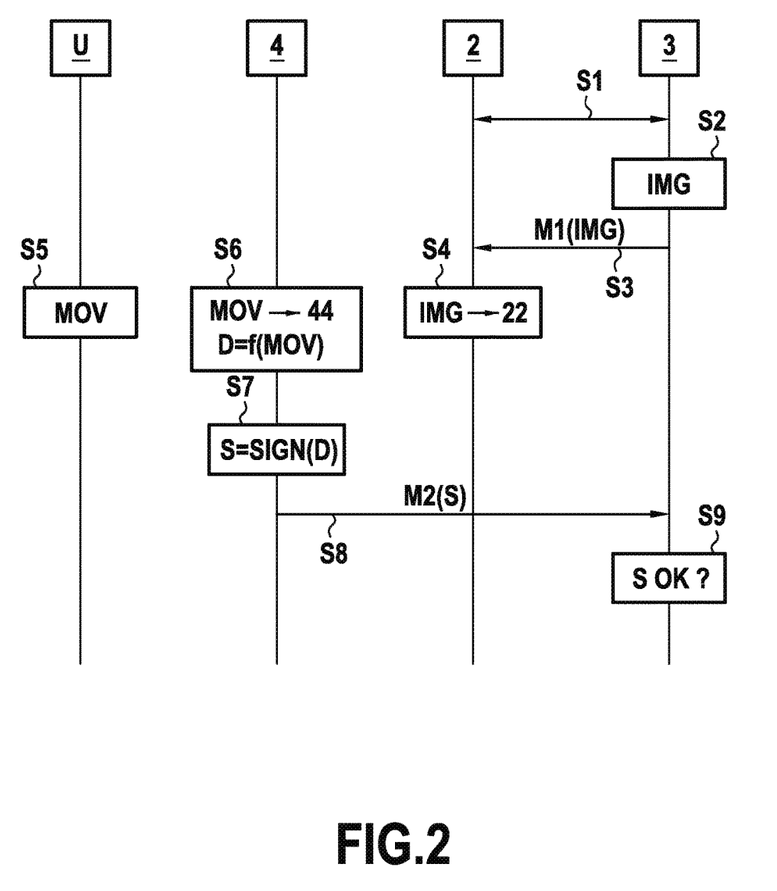
FIG. 2 is a flow diagram of a transaction in the system of FIG. 1, according to a first embodiment of the invention.

FIG. 2 is a flow diagram of a transaction in the system 1 of FIG. 1, according to a first embodiment of the invention.

Initially, the user U initiates a transaction with the server 3 (step S1). This may involve bi-directional communication between the terminal 2 and the server 3. In another embodiment, the user U uses another device than the terminal 2 for communication with the server 3, and specifies the how the server 3 can contact the terminal 2. For example, the user U uses a personal computer to initiate the transaction with a web server, and specifies his phone number.

Then, when the transaction needs to be validated by confirming that it is performed under the control of the user U, the server 3 determines an image IMG (step S2) and sends a message M1 containing the image IMG to the terminal 2 (step S3). The image IMG contains instructions for the user to perform a specific movement MOV. An example of a relation between the instructions contained in the image IMG and the movement MOV will be described hereafter.

In response to the reception of the message M1, the terminal 2 displays the image IMG on the screen 22 (step S4). Then, the user U performs the movement MOV instructed by the image IMG (step S5) while the sensor 44 measures the movement MOV and the secure element 4 determines data D on the basis of the measured movement MOV (step S6).

Then, the secure element 2 determines a signature S by signing data D with the cryptographic key K (step S7) and sends a message M2 containing the signature S to the server 3 (step S8). In an alternative, the message M2 is first sent from the secure element 2 to a secure device (not shown) and then from the secure device to the server 3. This also applies to the embodiments describes hereafter.

Finally, the server 3 checks whether the signature S corresponds to the image IMG of step S2 (step S9). For example, the server 3 check whether the signature S is a signature by user U of data D' corresponding to the instructions of image IMG. He, data D' represent data that should be determined at step S6 if the user U performs the correct movement. The transaction is validated only if the signature S corresponds to the image IMG of step S2.

The method of FIG. 2 allows checking that the transaction is performed under the control of the user U. Indeed, a malware which would run on the terminal 2 would have access to the image IMG, but not to the movement MOV which is measured on the secure element 4 nor to the cryptographic key K which is stored on the secure element 2. Thus, the malware would be incapable of generating a signature S corresponding to the image IMG without knowledge of the user U.

Figure 3:
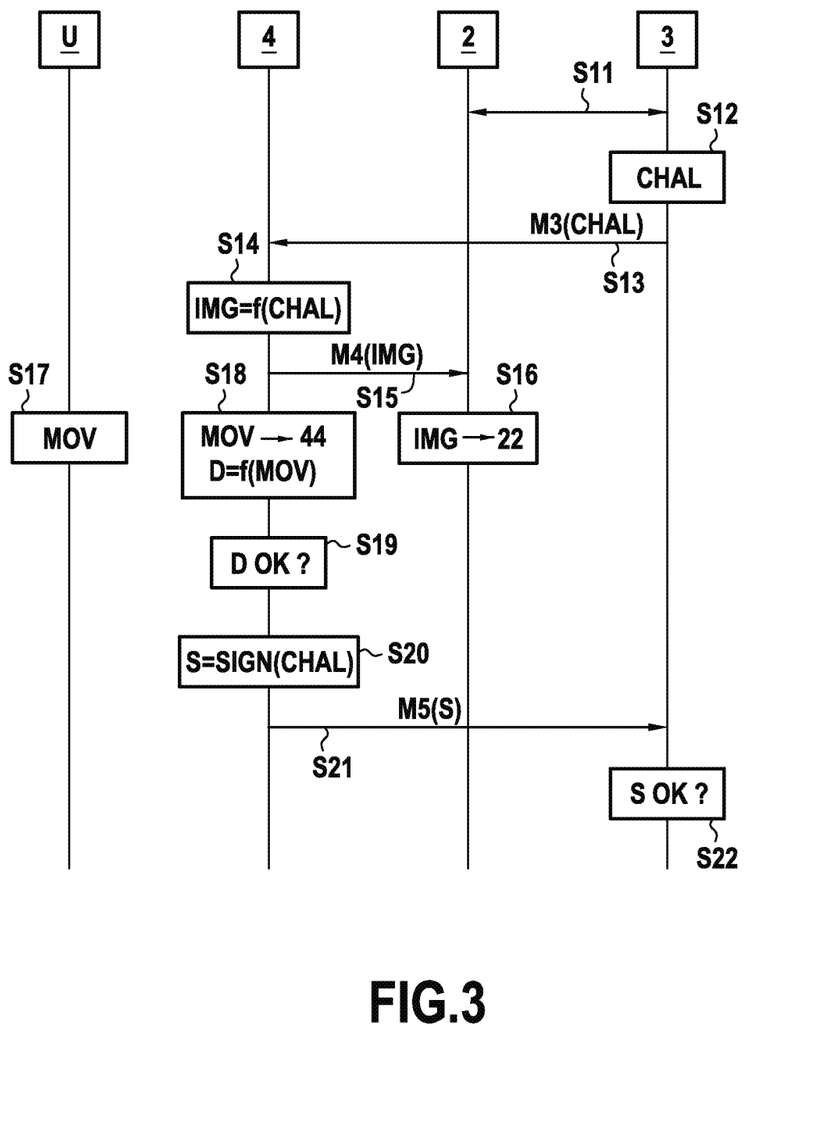
FIG. 3 is a flow diagram of a transaction in the system of FIG. 1, according to a second embodiment of the invention.

FIG. 3 is a flow diagram of a transaction in the system 1 of FIG. 1, according to a second embodiment of the invention.

Initially, the user U initiates a transaction with the server 3 (step S11). As in FIG. 2, this may involve bi-directional communication between the terminal 2 and the server 3, or the user U may uses another device than the terminal 2 for communication with the server 3, and specifies the how the server 3 can contact the terminal 2.

Then, when the transaction needs to be validated by confirming that it is performed under the control of the user U, the server 3 determines a challenge CHAL (step S12) and sends a message M3 containing the challenge CHAL to the secure element 4 (step S13). The challenge CHAL is for example a number determined in a pseudo-random manner and/or on the basis of transaction data.

In response to the reception of the message M3, the secure element 4 determines an image IMG (step S14) on the basis of the challenge CHAL. As in FIG. 2, the image IMG contains instructions for the user to perform a specific movement MOV. Then, the secure element 4 sends a message M4 containing the image IMG to the terminal 2 (step S15).

In response to the reception of the message M4, the terminal 2 displays the image IMG on the screen 22 (step S16). Then, the user U performs the movement MOV instructed by the image IMG (step S17) while the sensor 44 measures the movement MOV and the secure element 4 determines data D on the basis of the measured movement MOV (step S18).

Then, the secure element 4 determines whether data D correspond to the movement MOV instructed by the image IMG (step S19). For example, the secure element 4 compares data D with data D' representing data that should be determined at step S18 if the user U performs the correct movement.

If it is determined in step S19 that the data D correspond to the movement MOV instructed by the image IMG, the secure element 4 determines a signature S by signing the challenge CHAL with the cryptographic key K (step S20) and sends a message M5 containing the signature S to the server 3 (step S21).

Finally, the server 3 checks whether the signature S corresponds to the challenge CHAL of step S12 (step S22). The transaction is validated only if the signature S corresponds to the challenge CHAL of step S12.

The method of FIG. 3 allows checking that the transaction is performed under the control of the user U. Indeed, a malware which would run on the terminal 2 would have access to the image IMG, but not to the movement MOV which is measured on the secure element 4 nor to the cryptographic key K which is stored on the secure element 2, nor to the challenge CHAL which is not transmitted to the terminal 2. Thus, the malware would be incapable of generating a signature S corresponding to the challenge CHAL without knowledge of the user U.

In a variation of the method of FIG. 3, at step S17, the user U perform a movement MOV1 which correspond to the image IMG, and a movement MOV2 which correspond to his PIN. A technique for performing a movement which correspond to a PIN will be described hereafter. At step S18, both movements MOV1 and MOV2 are measured, data D are determined on the basis of MOV1 and an entered PIN, noted PIN' is determined on the basis of MOV2. Then, data D and PIN' are checked at step S19.

Figure 4:
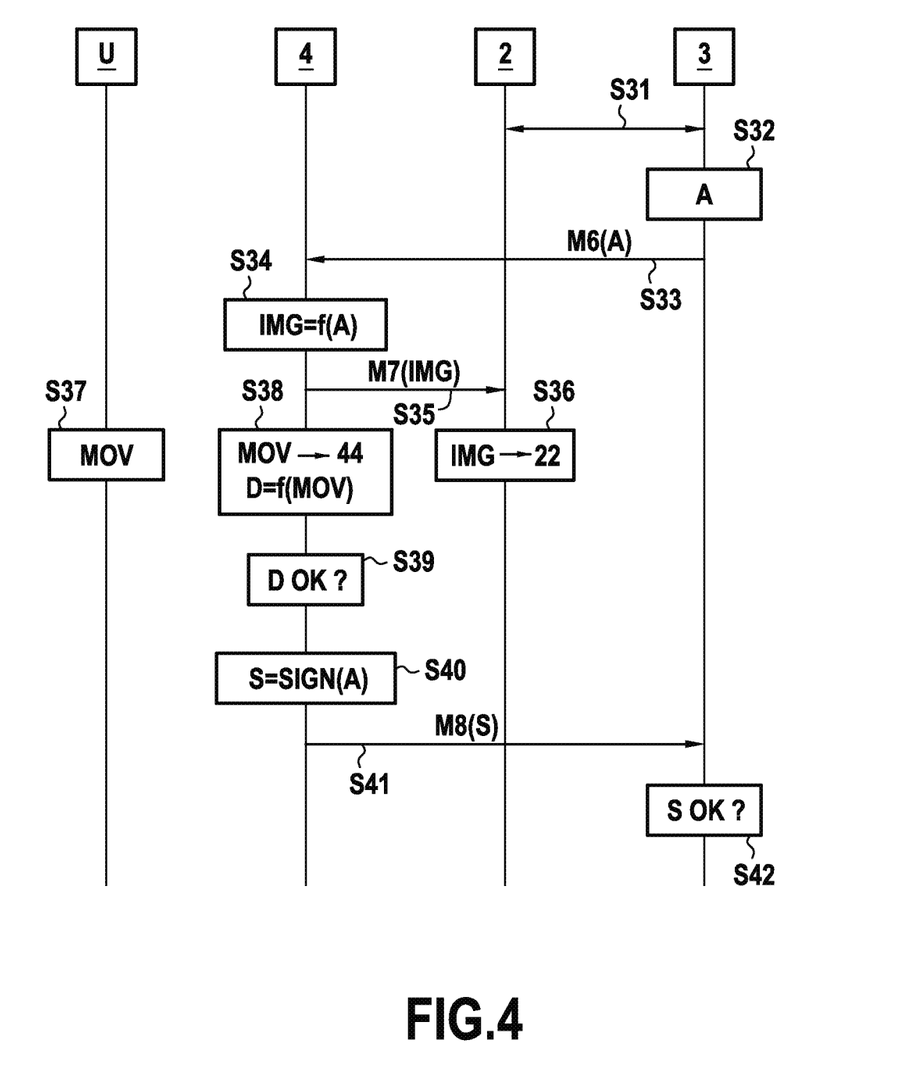
FIG. 4 is a flow diagram of a transaction in the system of FIG. 1, according to a third embodiment of the invention.

FIG. 4 is a flow diagram of a transaction in the system 1 of FIG. 1, according to a third embodiment of the invention.

Initially, the user U initiates a transaction with the server 3 (step S31). In this example, the transaction is a payment transaction of an amount A determined by the server 3 (step 32) and involves bi-directional communication between the terminal 2 and the server 3.

Then, when the transaction needs to be validated by confirming that it is performed under the control of the user U, the server 3 sends a message M6 containing the amount A to the secure element 4 (step S33).

In response to the reception of the message M6, the secure element 4 determines an image IMG (step S34) on the basis of the amount A. The image IMG contains instructions for the user to perform a specific movement MOV and the amount A. Then, the secure element 4 sends a message M7 containing the image IMG to the terminal 2 (step S35).

In response to the reception of the message M7, the terminal 2 displays the image IMG on the screen 22 (step S36). Then, if the user U agrees with the amount A displayed in the image IMG, he performs the movement MOV instructed by the image IMG (step S37) while the sensor 44 measures the movement MOV and the secure element 4 determines data D on the basis of the measured movement MOV (step S38).

Then, the secure element 2 determines whether the data D correspond to the movement MOV instructed by the image IMG (step S39).

If it is determined in step S39 that data D correspond to the movement MOV instructed by the image IMG, the secure element 4 determines a signature S by signing the amount A with the cryptographic key K (step S40) and sends a message M41 containing the signature S to the server 3 (step S41).

Here, the message M6 which includes the amount A and the message M8 which include the signature of the amount A may be messages conforming to payment standards, for example to the EMV standards.

Finally, the server 3 checks whether the signature 5 corresponds to the amount A of step S32 (step S42). The transaction is validated only if the signature corresponds to the amount A of step S32.

The method of FIG. 4 allows checking that the transaction is performed under the control of the user U and that the user agrees on the amount A. Indeed, a malware which would run on the terminal 2 would have access to the image IMG, but not to the movement MOV which is measured on the secure element 4 nor to the cryptographic key K which is stored on the secure element 2. Thus, the malware would be incapable of generating a signature S corresponding to the amount A without knowledge of the user U. Furthermore, in case the malware tries to modify the amount indicated in the displayed image, this would also, by side effect, modify the instruction related to the movement to be performed. The movement performed by the user U would not be recognized by the secure element 4 at step S39 and therefore the secure element 4 would not determine the signature S.

Figure 5:
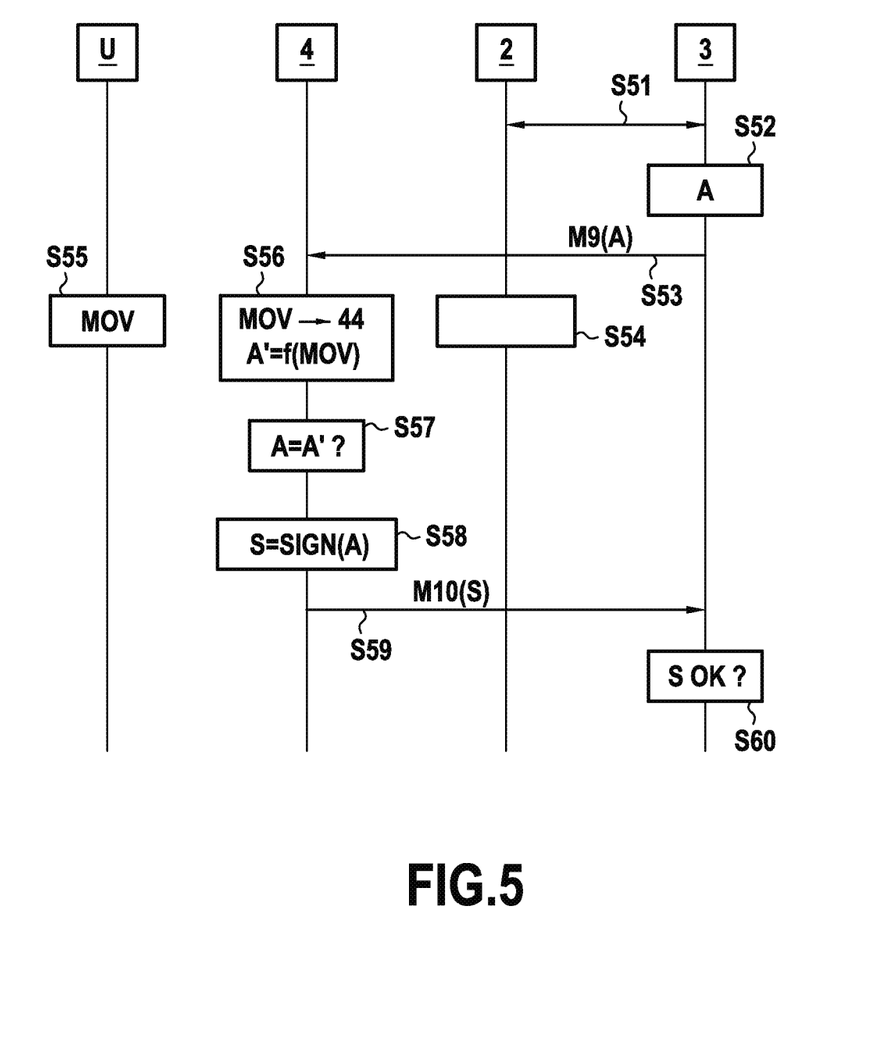
FIG. 5 is a flow diagram of a transaction in the system of FIG. 1, according to a fourth embodiment of the invention.

FIG. 5 is a flow diagram of a transaction in the system 1 of FIG. 1, according to a fourth embodiment of the invention.

Initially, the user U initiates a transaction with the server 3 (step S51). In this example, the transaction is a payment transaction of an amount A determined by the server 3 (step S52) and involves bi-directional communication between the terminal 2 and the server 3.

Then, when the transaction needs to be validated by confirming that it is performed under the control of the user U, the server 2 sends a message M9 containing the amount A to the secure element 4 (step S53). Furthermore, the terminal 2 prompts the user to enter the amount A' agreed for the transaction (step S54).

Thus in response to step S54, the user U performs a movement MOV representative of the amount A'. For example, the user U uses the terminal 2 which include the secure element 4 as a pen to write the amount A'. In a variation, the amount A' is entered in a similar manner to the entering of a PIN described hereafter. Meanwhile, the sensor 44 of the secure element 4 measures the movement MOV and the secure element 4 determines an amount A' from the movement MOV measured by the sensor 44 (step S56). Then, the secure element 4 compares the amount A' with the amount A of message M9 (step S57).

If A'=A, the secure element 4 determines a signature S by signing the amount A with the cryptographic key K (step S58) and sends a message M10 containing the signature S to the server 3 (step S59).

Here, the message M9 which includes the amount A and the message M10 which include the signature of the amount A may be messages conforming to payment standards, for example to the EMV standards.

Finally, the server 3 checks whether the signature S corresponds to the amount A of step S52 (step S60). The transaction is validated only if the signature corresponds to the amount A of step S52.

The method of FIG. 5 allows checking that the transaction is performed under the control of the user U and that the user agrees on the amount A. Indeed, a malware which would run on the terminal 2 would not have access to the movement MOV or to the amount A nor to the cryptographic key K. Thus, the malware would be incapable of generating a signature S corresponding to the amount A without knowledge of the user U.

Figure 6:
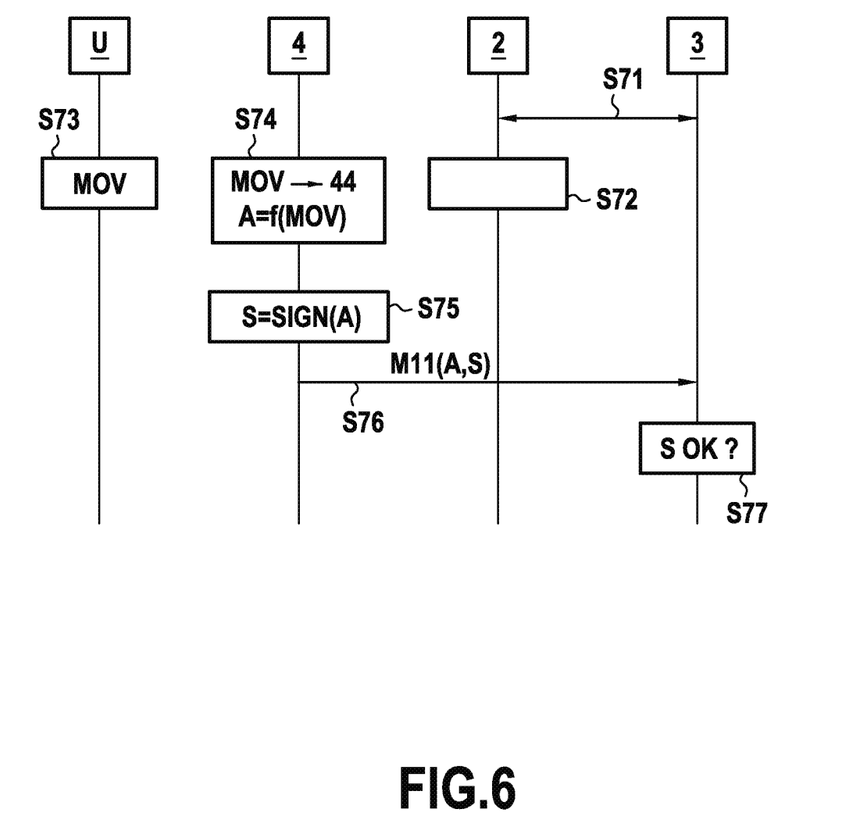
FIG. 6 is a flow diagram of a transaction in the system of FIG. 1, according to a fifth embodiment of the invention.

FIG. 6 is a flow diagram of a transaction in the system 1 of FIG. 1, according to a fifth embodiment of the invention.

Initially, the user U initiates a transaction with the server 3 (step S71). In this example, the transaction is a payment transaction of an amount A.

Then, the terminal 2 prompts the user to enter the amount A agreed for the transaction (step S72).

Thus in response to step S72, the user U performs a movement MOV representative of the amount A (step S73). Meanwhile, the sensor 44 of the secure element 4 measures the movement MOV and the secure element 4 determines the amount A from the movement MOV measured by the sensor 44 (step S74). Then, the secure element 4 determines a signature 5 by signing the amount A with the cryptographic key K (step S75) and sends a message M11 containing the signature 5 and the amount A to the server 3 (step S76).

Finally, the server 3 checks whether the signature S corresponds to the amount A of message M11 (step S77). The transaction is validated only if the signature S corresponds to the amount A of message M11.

The method of FIG. 6 allows checking that the transaction is performed under the control of the user U and that the user agrees on the amount A. Indeed, a malware which would run on the terminal 2 would not have access to the movement MOV or to the amount A nor to the cryptographic key K. Thus, the malware would be incapable of generating a signature S corresponding to the amount A without knowledge of the user U.

Figure 7:
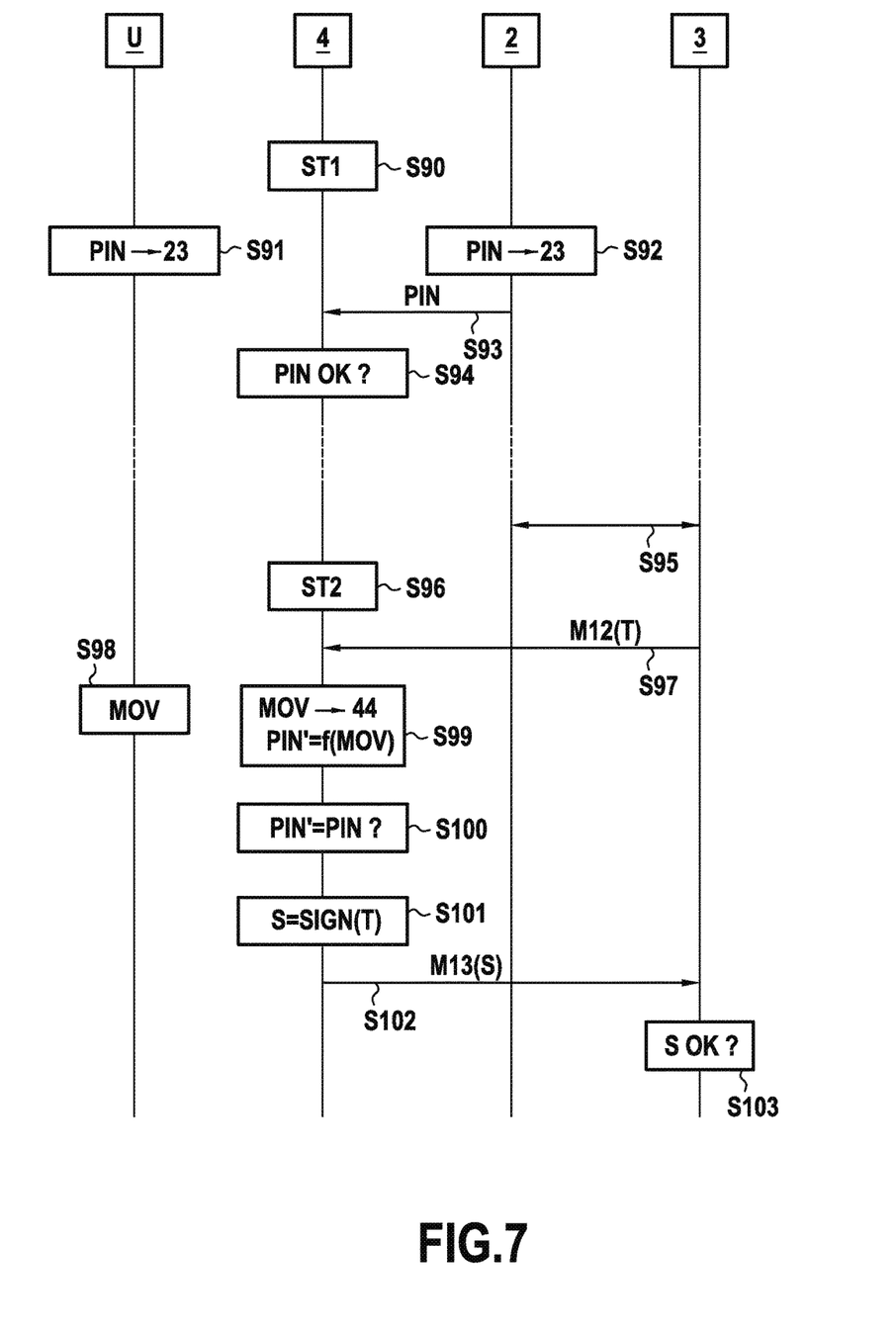
FIG. 7 is a flow diagram of a transaction in the system of FIG. 1, according to a sixth embodiment of the invention, and FIG. 8 illustrate a method for entering a PIN in the system of FIG. 1.

FIG. 7 is a flow diagram of a transaction in the system 1 of FIG. 1, according to a sixth embodiment of the invention.

In this embodiment, the secure element 4 controls the execution of functions protected by authentication. The secure element 4 is configured for comparing identification or authentication data entered by a user with identification or authentication data stored therein, and authorises the execution of a protected function only if the entered and stored data match. In this example, the identification or authentication data comprise a PIN. Furthermore, a first type of protected function can by authorised by entering the PIN on the user interface 21 of the terminal 2, while a second type of protected function can only be authorised by entering the PIN as described hereafter. In this example, a protected function of the first type comprises authentication with mobile telephone network, and a protected function of the second type comprises validating a transaction, for example a payment transaction.

Initially, the secure embodiment 4 is in a state ST1 wherein it accepts a PIN entered by the user U on the user interface 21. For example, when the terminal 2 is turned on, the secure element 4 enters state ST1 (step S90). Then, the user U enters his PIN on the keyboard 23 (steps S91 and S92) and the PIN is transmitted to the secure element 4 (step S93), for example in an ADPU command of the ISO 7816 standard. If the transmitted PIN matches the PIN stored in non-volatile memory 42, the secure element 4 allows authentication with the mobile telephone network (step S94). In other words, authentication with the mobile telephone network is a protected function of the first type mentioned above.

Later, the user U initiates a transaction with the server 3 (step S95). This may involve a bi-directional communication between the terminal 2 and the server 3.

At step S96, the secure element 4 detects the initiation of the transaction and switches in a state S2 wherein it does not accept a PIN entered on the user interface 21.

Then, the server 3 sends a message M12 to the secure element 4, containing data T related to the transaction (step S97). For example, in a similar manner to the message M6 of FIG. 4, data T contain an amount A.

The secure element 4 is configured for approving the transaction by signing the data T only if the user U enters his PIN. However, in state ST2, the user cannot transmit his PIN to the secure element 4 by entering it on the user interface 21. In other words, approving the transaction is a protected function of the second type mentioned above.

Thus, in step S98, the user U perform a movement MOV corresponding to his PIN. The movement MOV is measured by the sensor 44 and the secure element 4 determines an entered PIN, noted PIN', on the basis of the measured movement MOV (step S99). The, the secure element 4 determines whether PIN' and the PIN stored in non-volatile memory 42 match (step S100).

In case the PINs matches, the secure element 4 determines a signature S by signing the data T with the cryptographic key K (step S101) and sends a message M13 containing the signature S to the server 4 (step S102).

Here, the message M12 which includes data T and the message M13 which includes the signature of the data T may be messages conforming to payment standards, for example to the EMV standards.

Finally, the server 3 checks whether the signature S corresponds to the data T of message M12 (step S103). The transaction is validated only if the signature S corresponds to the data T of message M12.

The method of FIG. 7 allows checking that the transaction is performed under the control of the user U and that the user agrees on the data T. Indeed, a malware which would run on the terminal 2 would not have access to data T, the movement MOV or the cryptographic key K. Thus, the malware would be incapable of generating a signature S corresponding to the data T. Furthermore, in case the malware tries to send a PIN from the terminal 2 to the secure element 4, this PIN would not be accepted by the secure element 4 because it would have entered state ST2 upon detection of the beginning of the transaction. Thus, even if a malware intercepts the PIN of the user (for example at step S92), the transaction cannot be validated by the malware without the knowledge of the user. In other words, a protected function of the second type is more secure.

Figure 8:
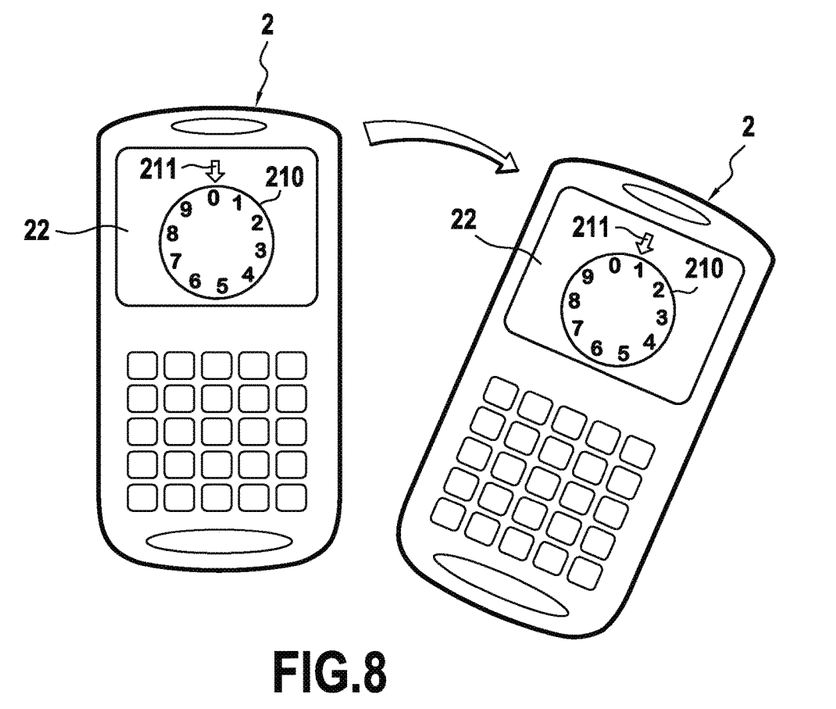

FIG. 8 represents an example of how a user can perform a movement MOV corresponding to instructions displayed in an image IMG (for example at steps S5, S17, S37) to an amount A or A' (for example at steps S55, S73) or to his PIN (for example at steps S37 of the variation mentioned above or step S98) and how the secure element 4 can determines data D, amount A or A' or PIN' (for example at step S6, S18, S38, S56, S74, S99) on the basis of the measured movement.

In this example, the sensor 44 is a compass capable of measuring an orientation of the secure element 4 and therefore of the terminal 2. The secure element 4 periodically transmits the orientation measured by the sensor 44 to the terminal 2.

The terminal 2 display an image on the screen 22 comprising a dial 210 and an arrow 211. The dial 210 comprises alphanumeric characters, in this example numbers 0 to 9. The arrow 211 is displayed at a fixed position while the terminal 2 controls the display of the dial based on the orientation measured by sensor 44. Thus, as show in FIG. 8, when the user performs a movement which changes the orientation of the terminal 2, the number of the dial 210 indicated by the arrow 211 changes.

When the user rotates the terminal 2 so that the arrow 211 indicates a specific number of the dial 210 and stops in this position, the secure element 4 considers that this specific number has been entered. By repeating this, the user can perform a movement MOV comprising a plurality of rotations and stops and which corresponds, for the secure element 4, to a succession of numbers. This succession of numbers represents data determined on the basis of the movement MOV, within the meaning of the present invention.

In the example of FIG. 8, the dial 210 is a predetermined image wherein the numbers 0 to 9 are displayed in order. However, the dial 210 may be an image determined by the secure element 4 wherein alphanumeric characters are displayed in a random order. In this case, it is not possible for a malware running on the terminal to determine the data D, amount A/A' or PIN' from the orientation transmitted from the secure element 4 in order to control the display of the dial.

In some of the embodiment above, an image comprise information for instructing the user to perform a specific movement and is displayed by the terminal. In a variation, information for instructing the user to perform the movement is comprised in another type of stimuli, for example a sound or a vibration, which is output by the terminal.

The invention claimed is:

1. A system for determining a presence of a user, and for securing a transaction between a server and a mobile device handled by said user, the system comprising:
   means for measuring a movement of a first device in the mobile device, the means for measuring including a microelectromechanical (MEMS) sensor or an accelerometer and the first device being a secure element, said first device includes means for receiving, from a server, instructions for validating the transaction and means for determining a stimuli based on the instructions for validating the transaction, the stimuli comprising instructions for performing a predetermined movement; and
   the mobile device comprising a user interface for displaying the stimuli;
   wherein the first device includes:
      means for determining data based at least on the measured movement from the sensor,
      means for determining whether the measured movement and the predetermined movement match, the predetermined movement being based on the instructions,
      means for determining a signature in response to the measured movement and the predetermined movement match by signing the determined data with a cryptographic key, and
      means for transmitting the signature to the server to allow said server to validate the transaction based at least on the signature.

2. The system according to claim 1, wherein the mobile device includes means for receiving the stimuli from the server, wherein the mobile device is coupled to the first device, and wherein the means for transmitting of the first device is further for transmitting the signature from the first device to a secure device.

3. The system according to claim 1, wherein the transaction comprises a payment transaction, and wherein the means for receiving of the first device is further for receiving an amount of the payment transaction from the server.

4. The system according to claim 1, wherein the determined data comprise transaction data.

5. The system according to claim 4, wherein said transaction data comprise an amount of a payment transaction.

6. The system according to claim 1, wherein the first device is configured to determine the predetermined movement based on the instructions for validating the transaction.

7. The system according to claim 1, wherein the stimuli comprises an image comprising instructions for a user to perform the predetermined movement.

8. The system according to claim 1, wherein the instructions for validating the transaction comprise a number determined in a pseudo-random manner or based on data related to the transaction.

9. A method for determining a presence of a user, and for securing a transaction between a server and a second device, said second device being a mobile device handled by said user, the method comprising:

measuring a movement of a first device in the second device by a sensor of the first device, the sensor being a microelectromechanical (MEMS) sensor or an accelerometer and the first device being a secure element;

receiving instructions for validating the transaction from a server at the first device;

determining a stimuli based on the instructions for validating the transaction, the stimuli comprising instructions for performing a predetermined movement;

displaying the stimuli on a user interface of the second device;

determining data based at least on the measured movement from the sensor;

determining by the first device whether the measured movement and the predetermined movement match;

determining by the first device a signature in response to the measured movement and the predetermined movement match by signing the determined data with a cryptographic key; and transmitting by the first device the signature to the server to allow the server to validate the transaction based at least on the signature.

10. The method according to claim 9, wherein the stimuli comprises an image comprising instructions for the user to perform the predetermined movement.

11. The method according to claim 9, wherein the instructions for validating the transaction comprise a number determined in a pseudo-random manner or based on data related to the transaction.

* * * * *

UNITED STATES PATENT AND TRADEMARK OFFICE
CERTIFICATE OF CORRECTION

PATENT NO. : 10,528,943 B2
APPLICATION NO. : 13/773298
DATED : January 7, 2020
INVENTOR(S) : Guillaume Dabosville et al.

Page 1 of 1

It is certified that error appears in the above-identified patent and that said Letters Patent is hereby corrected as shown below:

On the Title Page

Add item (30), Foreign Application Priority Data:
February 22, 2012 (FR) 1251593

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*